March 11, 1930.  B. M. SHIPLEY  1,749,960
CASH REGISTER
Filed March 26, 1923   5 Sheets-Sheet 1

Inventor
Bernis M. Shipley
By
His Attorneys

March 11, 1930.  B. M. SHIPLEY  1,749,960
CASH REGISTER
Filed March 26, 1923  5 Sheets-Sheet 2
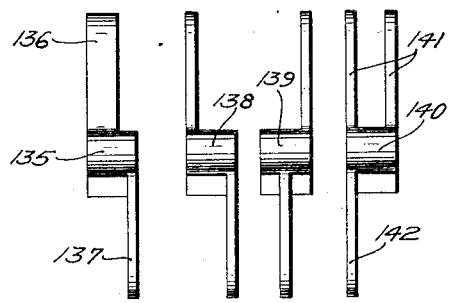
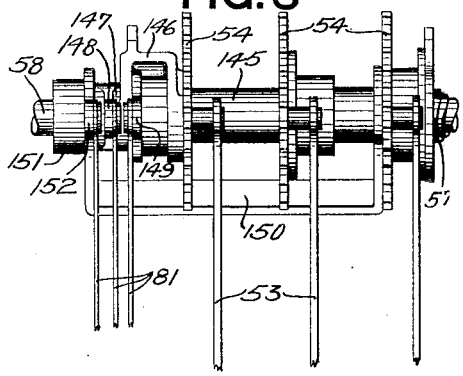
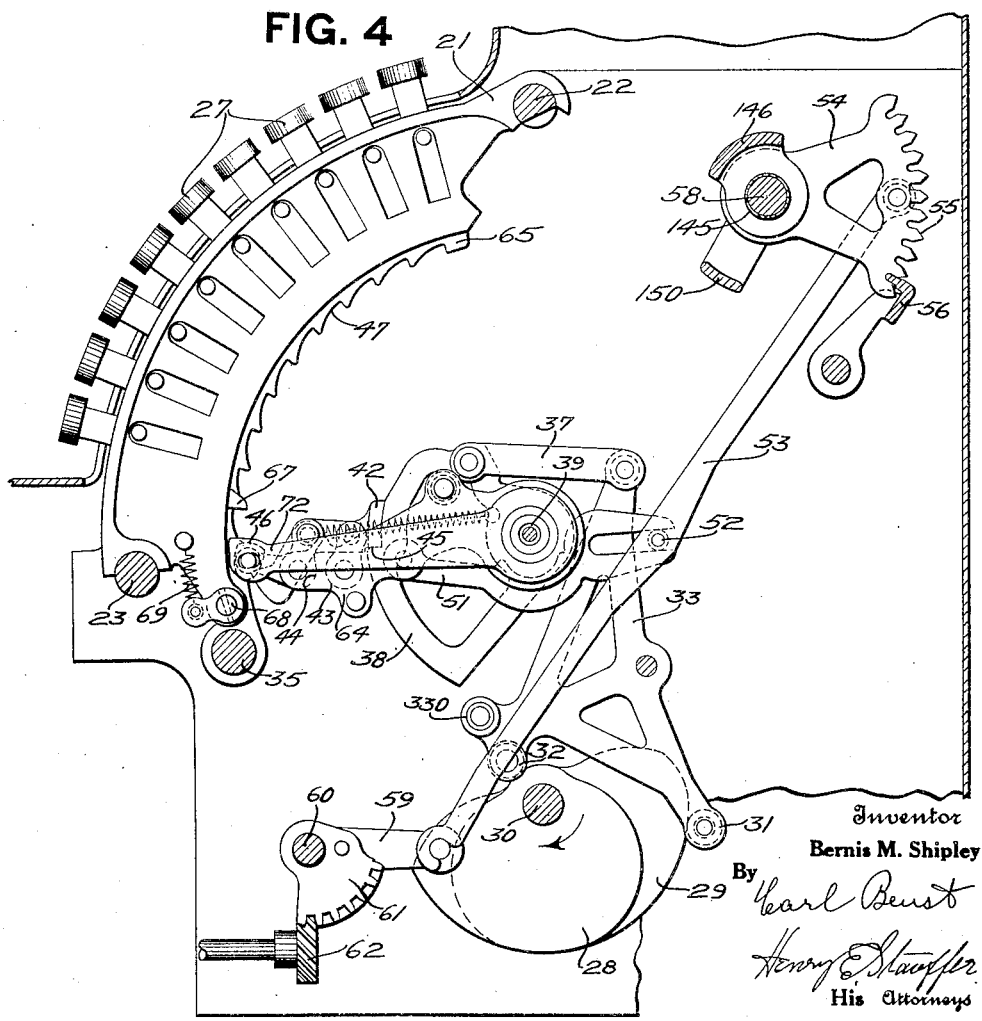

March 11, 1930.  B. M. SHIPLEY  1,749,960

CASH REGISTER

Filed March 26, 1923   5 Sheets-Sheet 3

Inventor
Bernis M. Shipley

His Attorneys

March 11, 1930. B. M. SHIPLEY 1,749,960
CASH REGISTER
Filed March 26, 1923 5 Sheets-Sheet 4

Inventor
Bernis M. Shipley
By
Karl Beust
Henry E Stauffer
His Attorneys

March 11, 1930.  B. M. SHIPLEY  1,749,960
CASH REGISTER
Filed March 26, 1923  5 Sheets-Sheet 5

Inventor
Bernis M. Shipley
By
Earl Beust
Harry E Stauffer
His Attorneys

Patented Mar. 11, 1930

1,749,960

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed March 26, 1923. Serial No. 627,711.

This invention relates to cash registers of the type illustrated and described in United States Letters Patent, No. 1,619,796, granted to B. M. Shipley on March 1, 1927, and has more particular relation to the mechanism for selecting one or more totalizer lines, from a plurality of totalizer lines for operation.

The principal object of this invention is to provide mechanism which will greatly increase the flexibility of the totalizer line selecting mechanism in machines of this type.

With this and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 2 is a detail view showing some of the modified forms of totalizer line selecting pawls which may be used with this invention.

Fig. 3 is a detail rear elevation of the connections between the control banks and their appropriate totalizer engaging control plates.

Fig. 4 is a transverse sectional view taken through the machine beside one of the control banks.

General description

Figure 1:
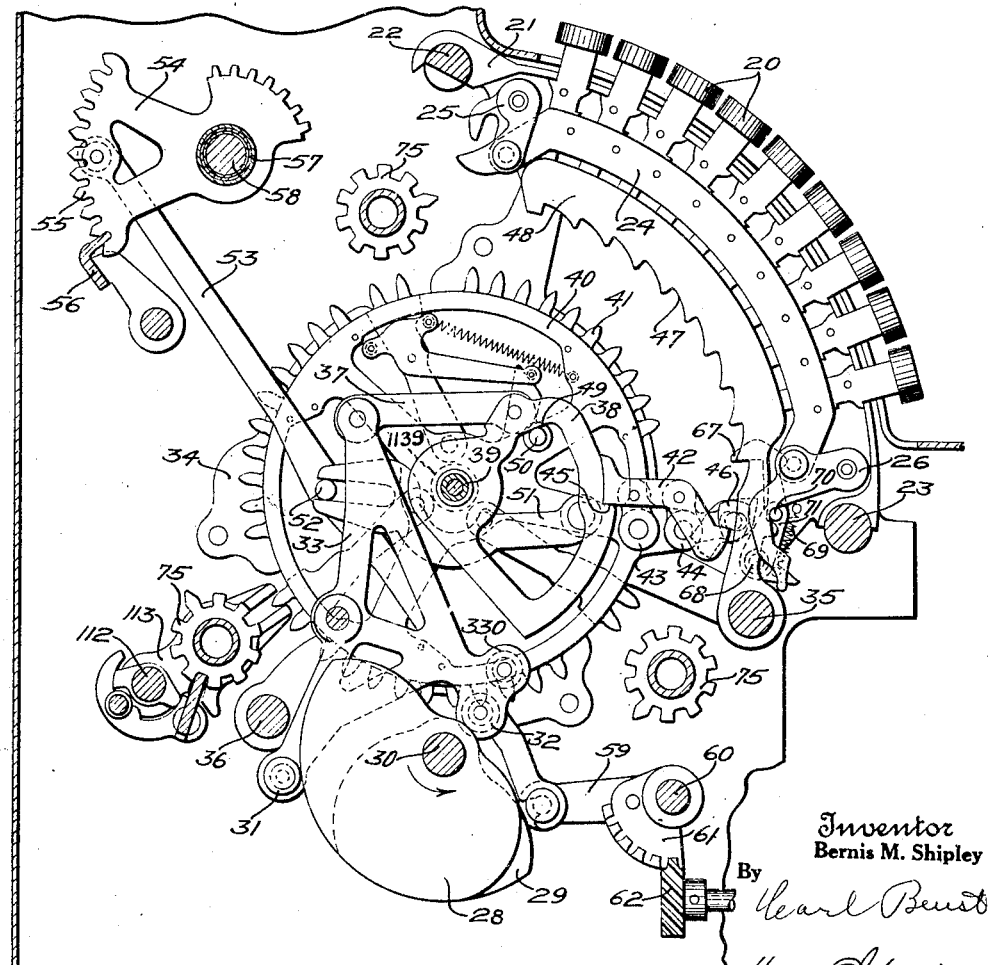
Fig. 1 is a section taken through the machine beside one of the amount banks.

The machine to which this invention is shown applied is of the general type shown and described in the patents to F. L. Fuller, Nos. 1,242,170 and 1,394,256, issued on Oct. 9, 1917, and Oct. 18, 1921 respectively, and the patent to B. M. Shipley, No. 1,619,796, issued March 1, 1927. Machines of this type are usually provided with three lines of totalizers, each line containing a plurality of individual totalizers, and mechanism is included for selecting either one, two or three of these lines for operation by the machine. The totalizer selecting mechanism of this invention is of an improved form, whereby its flexibility has been greatly increased, that is, a much larger number of selecting combinations can be provided with the mechanism shown herein than was possible in the previous machines.

Amount keys

The amount keyboard is identically the same as that used in the patents referred to above, and therefore but a very brief description of it will be included herein. It includes a plurality of banks of keys 20. The keys of each bank are slidably mounted in a key frame 21 supported at its upper end by a rod 22 and at its lower end by a rod 23, both mounted in the machine side frames. When a key in one of the amount banks is depressed, it is held in such position by a detent 24 carried by pivoted arms 25 and 26 supported by the key frame 21. The depressed key is also held in depressed position by a locking plate or detent not shown herein, but which is well known in the art. At the end of an operation of the machine, the depressed amount keys are released by mechanism shown in the above mentioned patents, which acts on the detents 24 and the locking plates to free the depressed keys, thus permitting them to be restored to normal undepressed positions by the usual key-restoring springs.

*Control banks*

In this machine there are three banks of control keys 27 (Figs. 4 and 11), which, like the amount keys, are slidably mounted in a key frame 21, also supported by the rods 22 and 23 above mentioned. These keys when depressed are held in such positions by detents, as is well known in the art, and are for the purpose of controlling the selection and engagement of any desired totalizer, as will be hereinafter described.

*Differential mechanism*

The differential mechanism which cooperates with the banks of amount keys in this machine is identically the same as that shown in the previously mentioned patents, and therefore only a short description thereof will be given herein. The differential mechanism for the machine is arranged in units, one unit for each bank of keys, and as these units are identical only one of them will be described. Each of these units is driven by a pair of cams 28 and 29 (Fig. 1) fast on a shaft 30 rotatably mounted in the machine side frames and given one complete rotation at every operation of the machine by any suitable mechanism, such as a motor or a crank handle. Cooperating with the cams 28 and 29 are anti-friction rollers 31 and 32 carried by a Y-shaped lever 33, which is pivotally mounted on a supporting hanger (not shown) but similar to a supporting hanger 34 appropriate to each differential unit. These supporting hangers 34 are carried by rods 35 and 36 supported by the machine side frames. Pivoted to the upper end of the Y-shaped lever 33 is a link 37 which is also pivoted to a driving segment 38 rotatably mounted on a bushing 39 carried by the supporting hanger (not shown). It can be seen that as the shaft 30 receives a complete counter-clockwise rotation (Fig. 1) on each operation of the machine, the driving segment 38 will be rocked by the cams 28 and 29, the Y-shaped lever and link 37, first counter-clockwise and then clockwise to its normal position. Also loosely mounted on the bushing 39 for each differential unit are two circular disk-like plates 40 between each pair of which are mounted the differential actuating segments 41 for the respective lines of totalizers. As above mentioned, in machines of this class there are usually three lines of totalizers adapted to cooperate with these actuating segments, and therefore, three segments are shown.

In the normal positions of the parts the differential actuating segments 41 are releasably connected to their common driving segment 38 by means of a latch 42 carried by a pivoted arm 43 and a bell crank 44 pivoted to an extension of the plates 40. At its rear end the latch 42 cooperates with a shoulder 45 formed on the periphery of the driving segment 38. It can be seen from the above that when the segment 38 is given its counter-clockwise movement, as above described, the differential actuating segments 41 will be carried therewith until the outer end 46 of the bell crank 44 contacts the inner end of a depressed key. When this occurs, the bell crank 44 will be rocked clockwise, (Fig. 1) to disengage the latch 42 from the shoulder 45 and at the same time, engage the forward end of the latch 42 with one of a plurality of notches 47 formed in a curved bar 48 carried by the differential supporting hanger (not shown). The driving segment 38 will continue its counter-clockwise movement, leaving the differential actuating segments 41 in whatever position they occupied when the latch was disconnected from the driving segment. When the driving segment 38 reaches the end of its stroke, it will return to home position. On its return movement a surface 49 of the driving segment 38 will contact a pin 50 mounted on the plates 40, to return the differential actuating segments to their normal home positions.

Pivoted to the segment supporting plates 40 is a beam 51 which, at its rear end, is bifurcated to embrace a stud 52 carried about midway of a link 53. It can be seen that the differential movement of the segments 41 will be imparted to the beam 51 by a roller 330 carried by the Y-shaped lever 33.

The differential actuating segments 41 turn counter-clockwise until disconnected from their driving segment 38 by contact of the connecting latch 42 with the inner end of a depressed key, and in turning, carry with them the pivoted end of the beam 51, the forked end of the beam merely pivoting on the stud 52. The beam is formed intermediate its ends with a concave face, (shown in dotted lines in Figs. 1 and 4) at a point below the bushing 39. Therefore, as the actuating segments 41 turn counter-clockwise, the concave face of the beam is brought more or less closely to or even contacted with a hub 1139 surrounding the bushing 39 and carried by the plates 40. In fact, the beam may assume any one of ten different positions (0–9) depending upon the digit just previously set up on the keyboard. In assuming some of these positions, as when the beam lies in its substantially horizontal position, and "nine" is to be registered, the movement of the differential actuating segments 41 from their normal positions to their "nine" positions, will cause the concave face of the beam to fit itself around the hub 1139 and, using such hub as a fulcrum point, swing the bifurcated end of the beam downwardly to its limit of movement in counter-clockwise direction.

Or, assuming the forked end of the beam to have been left at such limit of movement by the last operation, and that it is desired to add "five", the differential actuating segments 41 will swing the pivoted end of the beam in counter-clockwise direction, and advance the concave face toward the hub 1139 but not into contact therewith, and hence the forked end of the beam will only pivot about the stud 53.

In any event, however, the cam 29, acting upon the Y-shaped power transmitting lever 33, will force the roll 330 thereon against the lower edge of the beam 51 to fit the concave portion thereof around the hub 1139, if it is not already in such position.

In the first example given, where "nine" is added to "zero", the contact of roll 330 with beam 51 merely insures that the beam is correctly positioned, but in the second instance, where "five" is added to "nine", the roll 330 will press the beam upwardly until the concave portion of the beam fits around the hub, and in so doing, swings the beam on its pivot as a fulcrum to raise the forked end of the beam and with it, the link 53.

At the end of the operation of the machine, cam 28 has rocked the Y-shaped power transmitting lever to its normal position shown in Fig. 1, wherein the pressure roll 330 is withdrawn from the path of the beam 51.

The beam 51, as it is differentially positioned, actuates the link 53 accordingly, in the manner explained in the patents heretofore mentioned.

At its upper end the link 53 is pivoted to a segment 54 having teeth 55 formed thereon. An aliner 56 is adapted to normally engage the teeth 55, but shortly after the beginning of the operation of the machine, the aliner is disengaged from the teeth 55 (by mechanism not shown), thereby permitting the link 53 to be differentially set, whereupon the aliner is once more engaged with said teeth, to align the various parts of the differential mechanism. The segment 54 is carried by one of a plurality of sleeves 57 surrounding a shaft 58 and is adapted to operate indicating mechanism, as is well known in the art. The indicating mechanism, however, has nothing to do with this invention and therefore, it has not been shown herein.

At its lower end the link 53 is pivoted to an arm 59 which is journaled on a rod 60 carried by the machine side frames. Pinned to the arm 59 is a spiral segment 61 which meshes with a spiral pinion 62. By this means the differential setting of the segments 41 is transmitted to their appropriate type wheels in the printing mechanism which forms no part of this invention and therefore, is not shown or described further.

The differential mechanism which cooperates with the banks of control keys is approximately the same as that which cooperates with the amount keys, with the exception that there are no differential actuating segments in connection with these banks. For the sake of convenience identical parts in the control bank differential will be given the same reference numerals as those in the amount bank differentials. The control bank differential (Fig. 4) is driven by cams 28 and 29 cooperating with antifriction rollers 31 and 32 carried by a Y-shaped lever 33 which transmits its movement to the driving segment 38 through a link 37 identical with the same mechanism in the amount banks. A differentially positioned arm 64 loosely mounted on a bushing 39 supports the arm 43 and bell crank 44, which carry the latch 42. The latch 42 engages a shoulder 45 on the driving segment 38, as above described. As seen in Fig. 4, the driving segment 38 is given a clockwise rotation, and when the outer end 46 of the latch 42 strikes the inner end of one of the depressed keys 27 the latch will be disengaged from the shoulder 45 on the driving segment 38 and the forward end thereof engaged with one of the notches 47 in a curved bar 65 identical with the bar 48 for the amount keys.

Like the amount banks, the control banks are each provided with a beam 51, one end of which is pivotally secured to the differentially positioned arm 64 and the other end of which is slotted to embrace a roller 52 on a link 53, which link is given the differential movement determined by the key depressed in its corresponding bank. The beam is actuated in the same manner as explained in connection with the beam 51 associated with the amount bank. At its upper end the link 53 is pivoted to a segment 54 having teeth 55 cooperating with an aliner 56, as above described. In the particular embodiment of the invention herein shown, three banks or rows of control keys are shown (Fig. 11) and consequently there are three segments 54 (Fig. 3), two of which may be conveniently connected to their respective nested sleeves 57 in a manner well known in the art, the third segment being that shown at the extreme left in Fig. 3 and also shown in Fig. 4, being connected to the shaft 58 through the bail 146. At its lower end each link 53 is connected to an arm 59 secured to a spiral segment 61 journaled on rod 60 to drive the spiral pinion 62, as previously described.

When no key is depressed in either an amount or control bank, mechanism is provided to disconnect the respective latches 42 of the differential mechanisms from their drive segments 38 when the differential mechanisms have advanced from their normal to their zero positions, as is well known in the art. This disconnecting mechanism takes the form of a zero stop pawl 67, (Figs.

1 and 4), pinned on a shaft 68 carried by the lower end of the key frame 21. The zero stop pawls are normally maintained in their effective positions by means of springs 69.
It can be seen from Fig. 1 that when any key in a bank is depressed the detent 24 will be lowered. The arm 26 which supports the lower end of the detent will be rocked counter-clockwise about its pivot, and this arm has a downwardly extending portion which cooperates with a pin 70 projecting from a short arm 71 fast on shaft 68. The counter-clockwise movement of the arm 26 will, through the pin 70, rock the arm 71, shaft 68 and zero stop pawl 67 clockwise far enough to permit the outer end 46 of bell crank 44 to move past said pawl. When no key is depressed in a control bank an arm 72 (Fig. 4) loosely mounted on the bushing 39, and connected to the forward end of the bell crank 44 by a slot and pin connection, will come in contact with the zero stop pawl 67, and through said slot and pin connection will cause the bell crank lever 44 to be rocked counter-clockwise in order to disconnect the latch 42 from the driving segment 38.

Totalizers

As pointed out above, machines of the present type are usually provided with three lines of totalizers. Each of these totalizer lines (Fig. 1) carries a plurality of loosely mounted totalizer pinions or wheels 75. These totalizer pinions are arranged in groups and each totalizer consists of one pinion in each group of pinions. Therefore, if the first pinion of each group is engaged with the differential actuating segments 41 a certain individual totalizer will be operated. If the second pinion of each group is engaged with the actuators a different totalizer will be operated, etc. This arrangement of multiple totalizers is described in United States Letters Patent No. 1,109,763, granted Sept. 8, 1914 to Charles F. Kettering.

Figure 11:
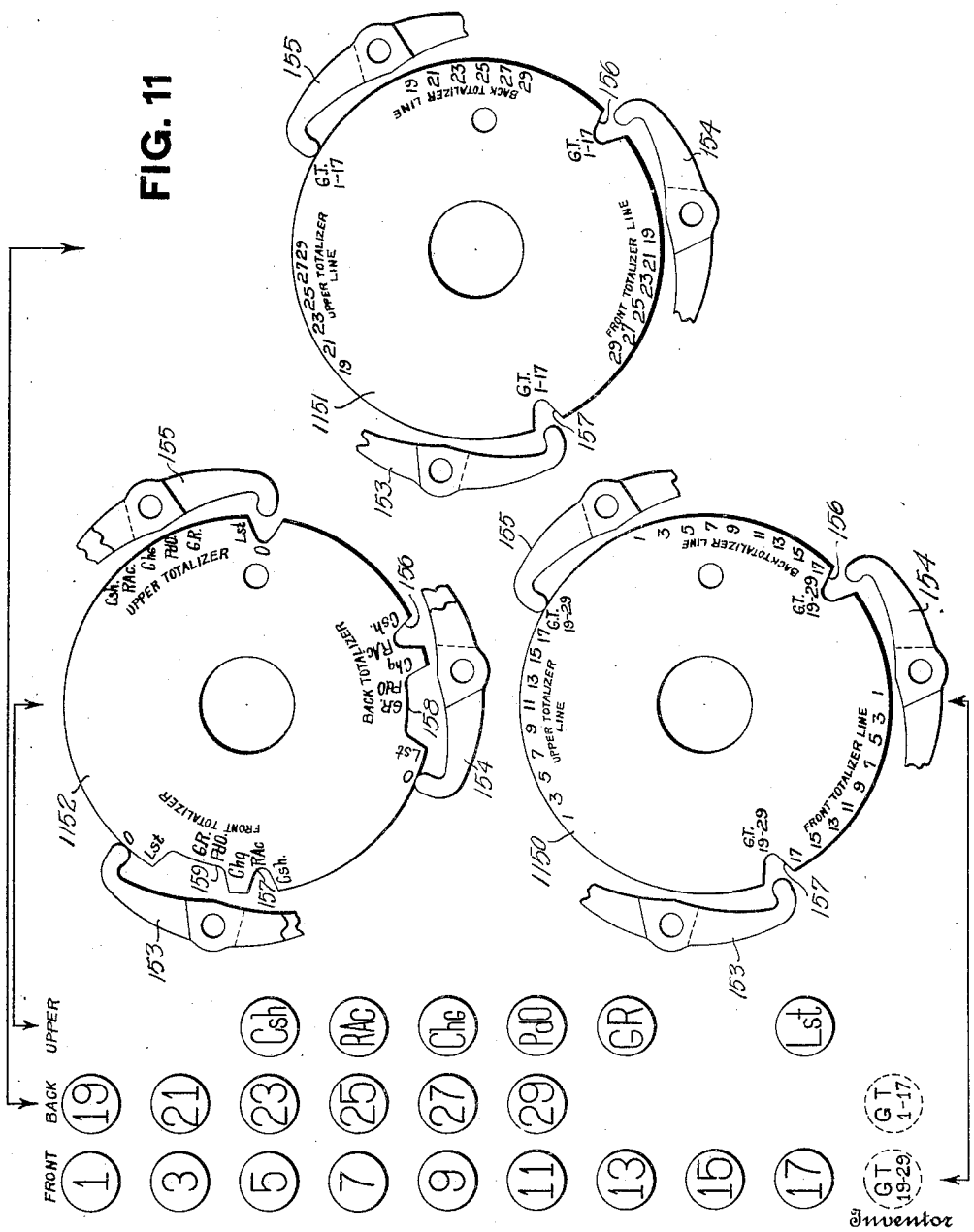
Fig. 11 is a diagrammatic view showing the relation between the three banks of control keys and the corresponding totalizer engaging control plates, together with the pawls or feelers which cooperate therewith.

To actuate any particular totalizer, the line which carries this totalizer must be shifted laterally of the machine to bring the pinions of the selected totalizer opposite the differential actuating segments 41. This shifting movement is under control of the keys 27 of the control banks. These control banks are shown in Fig. 11. The bank of keys numbered 1–17, inclusive, controls the shifting of the front totalizer line, the keys 19–29 inclusive, the back totalizer line, and the bank of transaction keys controls the upper totalizer line. The mechanism whereby the totalizer lines are slid laterally of the machine for the purpose of bringing them into position to be driven by the actuating segments 41 forms no part of this invention and is, therefore, neither shown nor described herein. If any description of this mechanism should be needed it can be found in the above mentioned patents.

Totalizer line selecting mechanism

As stated above, it is possible in this machine to simultaneously actuate totalizers on either one, two, or all of the totalizer lines. It is, therefore, necessary to provide mechanism for selecting the totalizer line to be rocked to engage a selected totalizer thereon with the actuating segments 41. This selection of the totalizer line to be operated is under the control of the three banks of control keys. It will be remembered that through the link 53 the segment 54 appropriate to each bank is differentially adjusted in accordance with the key depressed. The segment 54 (Figs. 3 and 4) for the first bank of control keys on the right (Fig. 11, but on the left as viewed in Fig. 3) is loose on a sleeve 145 surrounding shaft 58. This segment is connected by a yoke 146 (Fig. 3) to a hub 147 secured to the shaft 58 and from which hub projects an arm 148. The segment 54 for the second bank of control keys is fast on the right hand end (Fig. 3) of the sleeve 145 to the left hand end of which is secured an arm 149. The segment 54 for the third bank of control keys is fast on a sleeve 57 surrounding shaft 58 and is connected by a yoke 150 to a hub 151 loose on shaft 58. Projecting from this hub is an arm 152.

The sleeve 145 for the second control bank is fast to a sleeve 57 (Figs. 1 and 3) which surrounds shaft 58 and all the segments 54 are adapted to transmit their differential movement to the totalizer selecting cams (not shown) herein, but disclosed in the Fuller patents above mentioned. Pivoted to each of the arms 152, 148 and 149 connected with their respective segments 54 are links 81 (Figs. 3 and 6–11), which, at their lower ends are pivotally connected to substantially circular totalizer engaging control plates. These plates are loosely mounted on a hub 83 of the totalizer engaging and disengaging spider 87, which hub is journaled on a rod 84 carried by one of the control unit supporting frames (not shown) and mounted on the rods 35 and 36 above described.

Depression of a control key 27 (Fig. 4) interposes its inner end into the path of the outer end 46 of the bell crank 44, and also withdraws the zero stop pawl 67 to ineffective position.

Operation of the machine rotates shaft 30 with its cams 28, 29 to first rock the Y-shaped lever 33 clockwise, and then counter-clockwise.

On its clockwise travel, the Y-shaped lever, through link 37 rocks the driving segment 38 clockwise, and since the latch 42 on the differential arm 64 lies in front of the shoulder 45 on the drive segment 38, the latter rocks the differential arm clockwise until the outer end 46 of the bell crank 44 contacts the inner end of the depressed key, whereupon the latch 42 is withdrawn from in front of the shoulder 45, to permit the drive segment to complete its constant travel in clockwise direction, the differential arm 64 meanwhile remaining at the position to which it was rocked by driving segment, due to the engagement of the outer end 46 of the bell crank with the appropriate notch 47.

The differential arm 64 in moving clockwise, draws with it the beam 51, and the Y-shaped lever 33, as it approaches the end of its clockwise travel, forces the roll 330 against the lower edge of the beam to fit its concave inner edge around the bushing 39 or a collar thereon, if necessary.

Movement of the beam 51, whether effected through the differential arm 64, or the Y-shaped lever 33, or both, is transmitted through link 53 to the particular segment 54 appertinent to the control bank or row in which the key was depressed.

Figure 10:
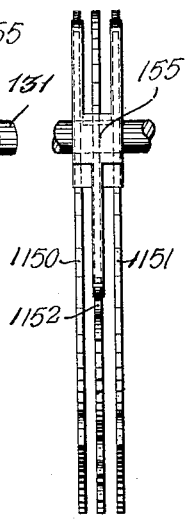
Fig. 10 is a detail end view of the three control plates and one of the cooperating pawls or feelers used therewith.

Assuming that a key in the first control bank at the right designated as "Upper" in Fig. 11, is depressed, the segment 54 shown in Fig. 4, and at the left in Fig. 3 will be rocked, and through its bail 146, hub 147 and arm 148 will shift the central one of the three links 81 shown in Fig. 4, which link 81 is pivotally connected at its lower end to the central control plate 1152 of the three plates shown in Fig. 10. It can be seen from the above that the control plates 1150, 1151 and 1152 are differentially positioned under the control of the three banks of control keys upon every operation of the machine.

Cooperating with the peripheries of the three control plates 1150, 1151 and 1152 are three feelers 153, 154 and 155, one for each of the front, back and upper totalizer lines respectively. These feelers each include a plurality of fingers, one of which may extend in one direction to operate upon the middle one of the control plates, and two other fingers extending in the opposite direction and cooperating with the two outside control plates. Each of the control plates has a plurality of notches formed in the periphery thereof, which are adapted to accommodate the rounded ends of the fingers of the feelers 153, 154 and 155. It may be stated here that the cooperation of the parts is such that when none of the notches 156, 157, 158 and 159 (Figs. 9 and 11) of the control plates 1150, 1151 and 1152 are opposite the ends of any of the fingers of a feeler, the totalizer line corresponding to this feeler will be rocked to engage the selected totalizer thereon with the differential actuating segments 41, but it can be seen that should a notch be opposite the single finger of the feeler, this finger of the feeler will drop into said notch, or should notches be opposite both ends of the bifurcated portion of the feeler, these ends will drop into the notches and thereby the totalizer line corresponding to this feeler will not be rocked and the totalizer thereon will not be engaged with the actuating segments. If, however, a notch is opposite the end of one of the fingers in the bifurcated portion, but not opposite the end of the other finger of the bifurcated portion the feeler can not drop, so that the totalizer line will be rocked to engage the totalizer thereon with the actuating segments. The mechanism whereby the above results are accomplished will now be described.

Totalizer engaging mechanism

Figure 5:
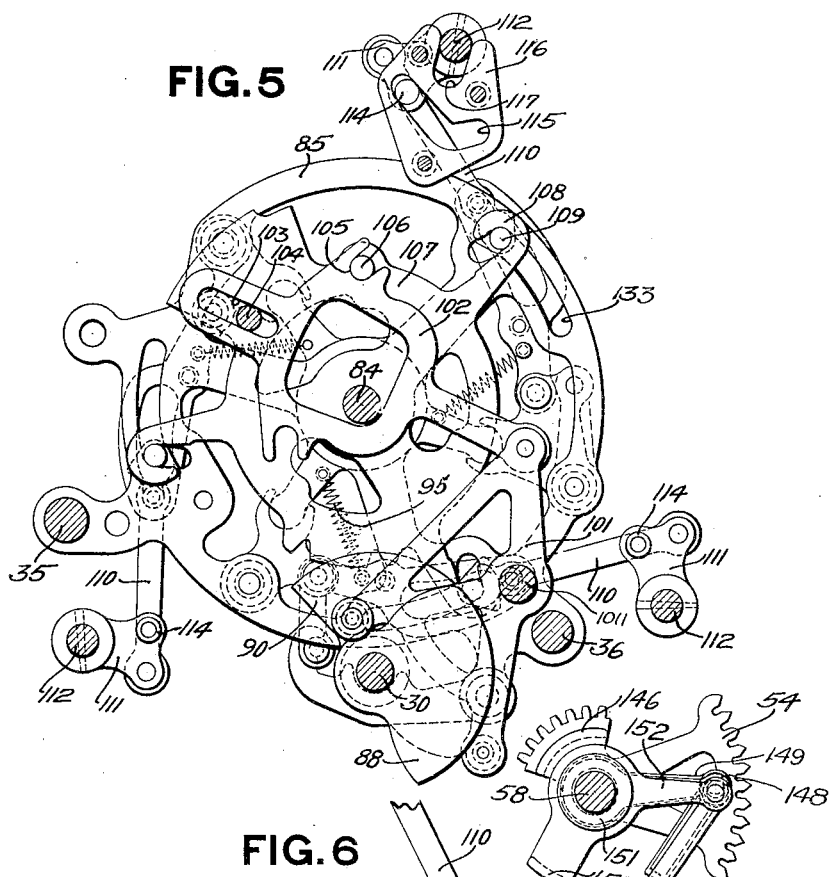
Fig. 5 is a detail side elevation of the mechanism for rocking the totalizer lines.
Figure 6:
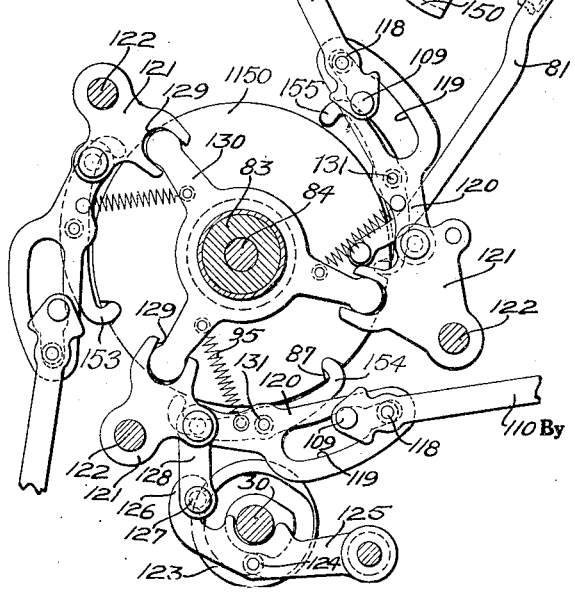
Fig. 6 is a detail side elevation of the mechanism for selecting the totalizer lines that are to be operated.

The totalizer engaging mechanism as used in the present machine, is old in the art and it is, therefore, thought that a brief description thereof will be sufficient. This mechanism is driven by two cams 88 and 90 (Fig. 5) fast on the main drive shaft 30. These cams cooperate with anti-friction rollers carried by a Y-shaped lever 101 pivoted at 1011 to the right hand machine side frame, and cause said lever 101 to be rocked first clockwise and then counter-clockwise upon every operation of the machine. Pivoted to the upper end of the Y-shaped lever 101 is a floating link 102 which at its opposite end is supported by a pin 104 which projects into a slot 103 in said member. The floating link 102 has a recess 105 in which normally projects a pin 106 carried by a three-armed totalizer engaging and disengaging spider 107, the hub 83 of which is loosely mounted on the rod 84. Each of the arms of the spider 107 is hooked as at 108 to engage a pin 109 carried by a link 110, there being a separate link and pin for each hooked arm (Figs. 5 and 6). At its opposite end each link 110 is pivoted to an arm 111 fast on a shaft 112. Each shaft 112 (Figs. 1 and 5) carries two arms 113 which support its respective totalizer line. The arm 111 has a pin 114 entered in a slot 115 in a plate 116 fast to the side frame of the machine. There is one of the plates 116 on each side of the machine. Opposite ends of the shaft 112 normally lie in the upper ends of slots 117 in the plates 116. The mechanism just described is shown in Fig. 5 as applied to the upper totalizer line, while the portion shown in Fig. 1 applies to the rear totalizer line. It is to be understood, however, that the mechanism is identical for each of the totalizer lines and that the showing of one is thought to be sufficient for all.

From the above description it can be seen that when the Y-shaped lever 101 is rocked clockwise, as above described, the floating link 102 will be moved toward the right (Fig. 5), which movement, due to the engagement of the pin 106 with the recess 105, will rock the spider 107 clockwise. As the pins 109 are in engagement with the hooked arms 108 of the spider 107, the links 110 will (Fig. 5) rock the arms 111 counter-clockwise and at the same time the shafts 112 will be moved inwardly far enough to bring the totalizer pinions 75 into engagement with the differential actuating segments 41. Near the end of the operation the parts are returned to their normal positions by means of the cams 88 and 90.

Figure 7:
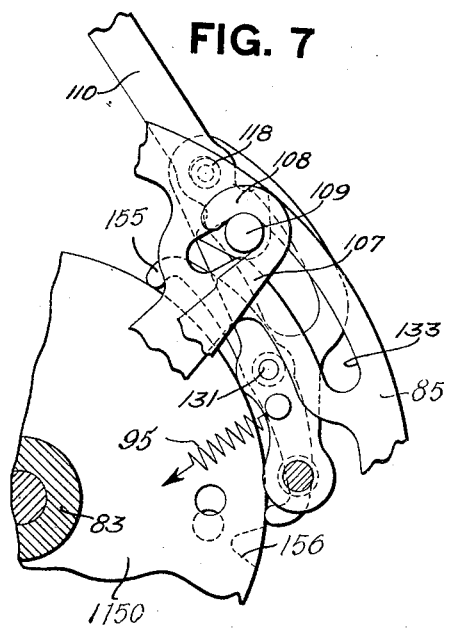
Fig. 7 is a detail side elevation of a portion of the totalizer engaging and disengaging mechanism with the parts in the position that they occupy when that particular line is to be engaged.
Figure 8:
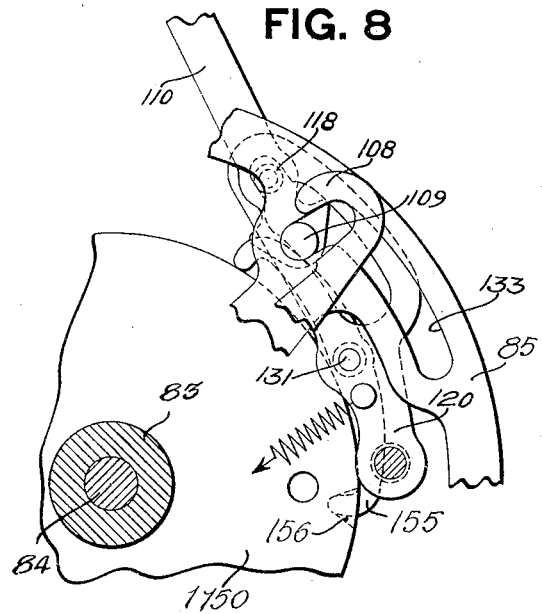
Fig. 8 is a detail side elevation of a portion of the totalizer engaging and disengaging mechanism with the parts in such positions that the corresponding totalizer line will not be engaged.
Figure 9:
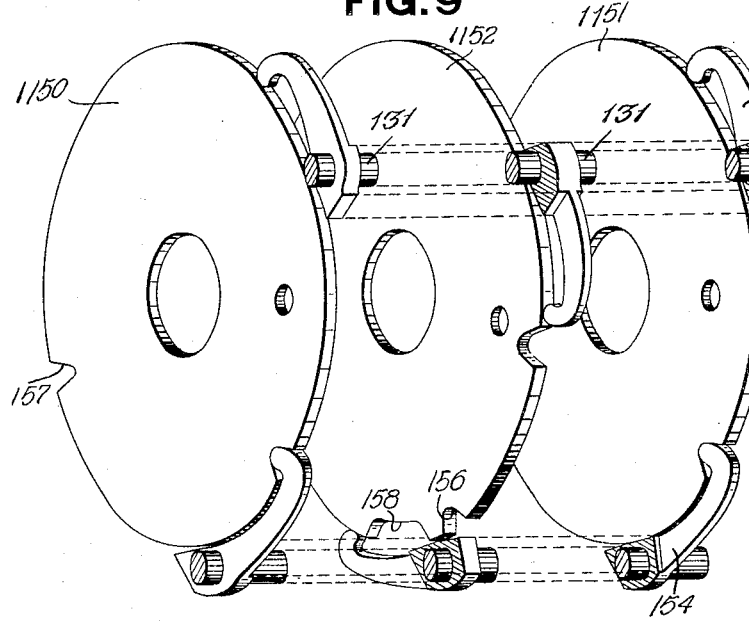
Fig. 9 is a detail perspective view of the three totalizer engaging control plates and their cooperating pawls or feelers.

It is evident that if it should be desired to prevent any particular totalizer line from being moved to prevent the engagement of any totalizer thereon with the differential actuating segments all that would be necessary would be to disengage the pins 109 from the hooked arms 108 previous to the movement of the spider 107. The mechanism for accomplishing this result will now be described. Each of the links 110 has a roller 118 (Figs. 6–8) adapted to traverse a slot 119 formed in an arm 120, pivoted to an arm 121 which is pivotally mounted at 122 to the control unit supporting frame 85 (Figs. 7 and 8). Fast on the main drive shaft 30 is a cam 123 (Fig. 6) which has a race formed therein to accommodate a roller 124 carried by an arm 125 pivoted to the frame 85. The arm 125 is hooked at its outer end, as at 126, to engage a pin 127 carried by a short link 128 which, at its opposite end, is pivoted to the arm 121 cooperating with the back totalizer line. When the main drive shaft 30 is rotated the cam 123 is given a complete clockwise rotation. At the beginning of the operation of the machine the arm 125 will be moved downwardly by means of this cam 123, and through the link 128, will rock the arm 121 clockwise. Each of the arms 121 is bifurcated as at 129 to accommodate the end of one arm of the three-armed lever 130 loosely mounted on the hub 83. It can be seen from Fig. 6 that any movement imparted to one of the arms 121 will be automatically transmitted to each of the other two arms. Therefore, when, at the beginning of the operation of the machine, the arm 121 is rocked clockwise, as just above described, the other two arms 121 are also rocked clockwise. Pivoted at 131 to each of the arms 120 is its corresponding feeler 153, 154 or 155, and it can be seen from Fig. 6, that, when the arms 121 are rocked clockwise, the arms 120 are rocked counter-clockwise about the pivot 131, which is the pivot between the arm 120 and its corresponding feeler. The feelers are held against the peripheries of the plates 1150, 1151 and 1152 by springs 95 (Fig. 6) stretched between the arms 120 and pins carried by the three-armed lever 130. This counter-clockwise movement of the arms 120 will, through the slots 119 and rollers 118, cause the pins 109 to be rocked inwardly toward the center and disengaged from the hooked arms 108 of the spider 107 if they have been left in engagement with said hooked arms at the end of the last operation. After the studs 109 have been disengaged from the hooked arms 108, and during the latter part of the clockwise movement of the arms 121, the fulcrum of the arms 120 shifts from the pivots 131 to the rollers 118 and the arms 120 are rocked counter-clockwise with said rollers 118 as the pivots, to move all feelers 153, 154 and 155 away from the peripheries of the control plates 1150, 1151 and 1152. The control plates 1150, 1151 and 1152 are then adjusted by the differential mechanism for the three banks of control keys to the positions corresponding to the keys depressed. The cam 123 then acts through the arm 125 and link 128 to rock the arms 121 for all three totalizer lines counter-clockwise. As the adjustment of the plates is such that no notches whatever are under either the single or the bifurcated ends of the feelers the pivotal point of the feeler with the arm 120 will form a fulcrum for the arm 120 so that upon the counter-clockwise movement of the arms 121 the arm 120 will be rocked clockwise about the pivot 131 and thereby move the pin 109 outwardly into engagement with the hooked arm 108 of the engaging spider 107. If, on the other hand, a condition such as shown in Fig. 6 exists, that is, that the control disks have been so positioned by the control keys that a notch on the middle plate 1152 is adapted to cooperate with the single finger of the feeler 155, or so that two notches in the end plates are in position to cooperate with the bifurcated end of the feeler, it is evident that when the arm 121 is rocked counter-clockwise to restore the feelers 153, 154, 155 to contact with the control disks 1150, 1151 and 1152, the ends of the finger or fingers at one or the other end of one or more of the feelers will enter the notches in register therewith, whereby to shift the pivotal point of the arm 120 from 131 to the pin 118 and therefore the pin 109 carried by the link 110 will not be moved outwardly to reengage its hooked arm 108, but will remain in its disengaged position. Then when the engaging spider 107 is rocked to bring the selected totalizers into engagement with the differential actuating segments 41, the particular totalizer line which is controlled by the feeler, either end of which lies in a notch in the control plates, will not be rocked and none of its totalizers will be engaged with the actuating segments. The operation of this mechanism can be seen very clearly from Figs. 6, 7 and 8. In Fig. 7 the pin 109 is shown in engagement with the hooked arm 108 of the spider 107 due to the fact that both ends of the feeler rest upon the peripheries of the disks 1150, 1151 and 1152. In Fig. 8, however, it will be noticed that the lower finger of the feeler is seated in a notch in the plates 1152 and therefore when the arm 120 is rocked as above described, the pin 109 will remain in its disengaged position and will not be engaged by the hooked arm 108 of the spider 107, so that the totalizer line corresponding to this feeler will not be moved to engage a totalizer with the differential actuating segments 41. The pins 109 for all three totalizer lines extend through, and are guided by, slots 133 cut in the control unit supporting frame 85.

In Fig. 2 there are shown four types of feelers which may be used with the present invention. Feeler 135 has one broad finger 136 which will cooperate with both the first and second plates, and a narrow finger 137 which cooperates with the third plate. Feeler 138 has only two fingers, one cooperating with the first plate and one with the third plate. Feeler 139 has only two fingers, one for the second and one for the third plate. The feeler 140 has two fingers 141 on one side cooperating with the first and third plates and one finger 142 also cooperating with the first plate. These modified feelers give some idea of the great number of control combinations which may be provided by varying the construction of the feelers.

*Operation*

It is believed that a clearer understanding of the invention may be had if the description of the operation of the device with concrete examples of its action is given. Fig. 11 shows the three banks of control keys and the three control plates 1150, 1151 and 1152, together with the feelers which cooperate therewith. It is to be understood that there are only three feelers, one for each totalizer line, cooperating with all three totalizer control plates.

It should be stated that there are two grand total totalizers provided in this machine in the zero positions of the front and back totalizer lines. This construction is well known in the art and it is thought that it will be sufficient herein to state that when any key in the bank of keys numbered 1–17 is depressed, the grand totalizer on the back totalizer line will be selected automatically, due to the fact that the differential mechanism will be disconnected from the driving actuators in the zero position in the bank of keys appropriate to this plate. If, on the other hand, any key in the 19–29 bank is depressed, the grand totalizer on the front line is automatically selected for operation. Any suitable interlocking mechanism may be provided to prevent a depression of a key in the 1–17 bank and a key in the 19–29 bank simultaneously, as if this were done, nothing would be added into the grand total totalizers, and it is desired that they operate on every cash operation.

If we take, for example, a transaction wherein the keys numbered, 1, 3, 5, etc., represent clerks, and it is assumed that clerk "5" makes a cash sale, the operation will be as follows. Clerk 5 will depress the "5" key in the 1–17 bank. The key numbered "5" in this bank is in the seventh position of the differential mechanism. This bank of keys controls the first, or left hand, plate 1150 and it can be seen that when the plate is moved to the "5" position, that is, when the point indicated by the numeral "5" (Fig. 11) on the group of numbers under the words "Front totalizer line" is advanced by rotating the control disk 1150 in clockwise direction so as to bring it to the position occupied by the index "G. T. 19—20" the notches 156 and 157 will be shifted out of registry with the fingers of the feelers 154 and 153, but not far enough to register with any other feeler so that there will be no notches brought into position to cooperate with any of the feelers. The third plate 1151 from the left, which is the one corresponding to the 19–29 bank of keys, will not be moved, as no key in that bank is depressed. It can be seen, therefore, from an inspection of this plate in its zero position, as shown in Fig. 11, that there are notches 156 and 157 in position to cooperate with the feelers 153 and 154 for the front totalizer line and the back totalizer line. There is no notch in the zero position of the control plates or disks 1150 and 1151 corresponding to the upper totalizer line. The plate 1152 corresponding to the transaction bank of keys is advanced in clockwise direction to bring the points indicated as "Csh" (cash) opposite the fingers of the feelers, in which position it can be seen there are no notches corresponding to the feelers of any of the three lines. It will be remembered that the feelers 153, 154 and 155 are constructed so that they have a single finger extending on one side of their pivotal point and a pair of fingers extending on the opposite side of their pivotal point. The single fingers cooperate with the middle one 1152 of the three plates, which plate is controlled by the transaction keys, while the twin fingers on the other end of the feelers cooperate with the plates 1150 and 1151.

Considering each totalizer line separately and taking first the upper totalizer line, the plate 1150 corresponding to the 1–17 bank has no notch in the "5" position. Also, the zero position of the third plate 1151 for the upper totalizer line has no notch. Therefore, the twin fingers of the feeler for this line will be held on the periphery of said plates. The portion of the second plate 1152 cooperating with the upper totalizer line does not have a notch in the Csh (cash) position and therefore the single finger of the feeler will also be held on the periphery of the plates. Therefore, as both the single and twin fingers of the feeler 155, cooperating with the upper totalizer line, are held up on the peripheries of the control plates, this particular line will be rocked into engagement on the operation which is now being described, in order to bring the cash totalizer into engagement with the totalizer actuating segments 41.

On the first plate 1150 the portion corresponding to the back totalizer line, when moved to the "5" position, has no notch. The third plate 1151 is not moved and the zero position of this plate in the portion corresponding to the back totalizer line has a notch 156. However, the twin fingers of the feeler 154 are held up on the peripheries of the plates due to the unnotched arc on the plate 1150. The cash position of the plate 1152 in the portion controlling the back totalizer has no notch, and therefore the single finger of the feeler 154 is held on the periphery of the plate, and as above described, the back totalizer line will be rocked in order to bring the grand total totalizer 1–17, which is on this line, into engagement with the differential actuating segments. The "5" position on the portion of the plate 1150 which cooperates with the front totalizer line has no notch therein. The zero position of the portion of the plate 1151 cooperating with the front totalizer line has a notch 157 therein. However, as that finger of the twin fingers of the feeler 153 which cooperates with the plate 1150 has no notch thereunder in this operation, the twin fingers of the feeler will be held up even though there is a notch in the zero position of the plate 1151. The cash position on the portion of the plate 1152 corresponding with the front totalizer line does not have a notch therein so that the single finger of the corresponding feeler is maintained on the periphery of this plate and as the twin fingers are held in their raised positions due to the fact that there is no notch in the "5" position on the plate 1150, the front totalizer line will also be rocked to move the selected totalizer thereon into engagement with the differential actuating segments 41. It is evident, therefore, that on an operation such as that above described, all three totalizer lines will be rocked to move their respective selected totalizers into engagement with the differential actuators, as it is desired to add the amount to the "5" totalizer on the front line, the grand totalizer on the back line, and the cash totalizer on the upper line.

A "Paid out" operation will now be described, in which clerk 19 is the operator. In this operation, it is of course desired that the amount shall not be added into the grand total 19–29, as this would make an incorrect total on said grand totalizer. The clerk depresses the "19" key in the second bank from the left and the "Paid out" key in the third bank from the left. The machine is operated and the control plates or disks 1151 and 1152 are set up under control of the keys depressed in these two banks. As no key is depressed in the first bank, this plate 1150 will not be moved. The second plate 1152 will be moved to the "Paid out" position and the third plate 1151 to the "19" position. Taking first the portion of plate 1150 cooperating with the upper totalizer line, it can be seen that the zero position has no notch therein. In the third plate 1151 which has been moved to the "19" position, the portion corresponding to the upper totalizer line has no notch, and in the portion of the central plate 1152 corresponding to the upper line the "Paid out" position has no notch. It can therefore be seen that the upper totalizer line will be rocked to move the "Paid out" totalizer into engagement with the actuators in order to add the amount on the "Paid out" totalizer. The zero position of the portion of the first plate 1150 corresponding to the back totalizer line has a notch 156 therein. In the third plate 1151, the portion corresponding to the back totalizer line has no notch in the "19" position to which this plate has been moved, while in the second plate 1152 the "Paid out" position for the back totalizer line has a notch 158 cut therein. From this it can be seen that the twin fingers of the feeler 154 will remain on the peripheries of plates 1150 and 1151, due to the fact that there is no notch in the "19" position of plate 1151. The single finger of the feeler 154, however, which engages plate 1152, will enter the notch corresponding with the "Paid out" position, of the back totalizer line. Therefore, the back totalizer line will not be engaged on this operation, as it is not desired to have anything except cash added on the clerks' totalizers. On the portion of plate 1150 corresponding to the front totalizer there is a notch 157. On the portion of plate 1151 corresponding to the front totalizer, which has been moved to the "19" position there is no notch, and therefore the twin fingers of the feeler 153 corresponding to the front totalizer line will be held out upon the peripheries of the plates. In the portion of plate 1152 corresponding to the front totalizer line, the "Paid out" position has a notch 159 and therefore the single finger of the feeler 153 will drop into this notch, and upon the operation of the machine, the front totalizer line will not be engaged with the actuators, as a "Paid out" transaction should not be added to the grand totalizer.

It is to be understood that the present construction is extremely flexible. In Fig. 2, a plurality of different types of feelers are shown which may be used with this construction, thereby giving a great number of different combinations of totalizers which may be selected. In the present application all three of the feelers are identical in order to simplify the description and make it more easily understood, but it is not intended to limit the invention in any way to the form shown herein.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of totalizers, a plurality of supporting means for said totalizers, means for actuating any desired totalizer, the totalizers being normally disengaged from the actuating means, means for engaging the desired totalizer with and disengaging it from said actuating means, and means for controlling said engaging means comprising a plurality of members and a plurality of feelers each provided with a plurality of fingers cooperating with said members.

2. In a machine of the class described, the combination of a plurality of totalizers, a plurality of members supporting said totalizers, means for actuating any desired totalizer, the totalizers being normally disengaged from the actuating means, means for engaging the desired totalizer with and disengaging it from said actuating means, and means for controlling said engaging means comprising a plurality of plates and a plurality of multi-finger feelers, all the fingers of each of which are adapted to cooperate.

3. In a machine of the class described, the combination of a plurality of groups of totalizers, supporting means for each group, means for actuating any totalizer in any group, the totalizers being normally disengaged from the actuating means, means for engaging any desired totalizer in one or more of said groups with and disengaging it or them from said actuating means, a plurality of plates for selectively controlling the operation of said engaging means, and a plurality of multi-finger feelers cooperating with the peripheries of said plates.

4. In a machine of the class described, the combination of a plurality of totalizers, a plurality of members supporting said totalizers, means for actuating any desired totalizer, the totalizers being normally disengaged from the actuating means, means for engaging the desired totalizer with and disengaging it from said actuating means, and means for controlling said engaging means comprising a plurality of plates and a plurality of feelers each of which is provided with a plurality of fingers cooperating with said plates.

5. In a machine of the class described, the combination of a plurality of totalizers, a plurality of members supporting said totalizers, means for actuating any desired totalizer, the totalizers being normally disengaged from the actuating means, means for engaging the desired totalizer with and disengaging it from said actuating means, and means for controlling said engaging means comprising a plurality of rotatable plates and a plurality of multi-finger feelers each of the fingers of which is adapted to cooperate with one of said plates.

6. In a machine of the class described, the combination of a plurality of groups of totalizers, supporting means for each group, means for actuating any totalizer in any group, the totalizers being normally disengaged from the actuating means, means for engaging any desired totalizer in one or more of said groups with and disengaging it or them from said actuating means, a plurality of rotatable plates for controlling which of said groups will engage, and a plurality of multi-finger feelers cooperating with the peripheries of said plates.

7. In a machine of the class described, the combination of a plurality of groups of totalizers, supporting means for each group, means for actuating any totalizer in any group, the totalizers being normally disengaged from the actuating means, means for engaging any desired totalizer in one or more of said groups with and disengaging it or them from said actuating means, a plurality of rotatable plates having notches cut in their peripheries for determining which of said groups will engage, and a plurality of multi-finger feelers cooperating with said notches.

8. In a machine of the class described, the combination of a plurality of groups of totalizers, supporting means for each group, means for actuating any totalizer in any group, the totalizers being normally disengaged from the actuating means, means for engaging any desired totalizer in one or more of said groups with and disengaging it or them from said actuating means, a plurality of rotatable plates having notches cut in their peripheries for determining which of said groups will engage, and a plurality of multi-finger feelers pivotally mounted adjacent said plates and adapted to cooperate with said notches.

9. In a machine of the class described, the combination of a plurality of groups of totalizers, supporting means for each group, means for actuating any totalizer in any group, the totalizers being normally disengaged from the actuating means, means for engaging any desired totalizer in one or more of said groups with and disengaging it or them from said actuating means, a plurality of rotatable plates having notches cut in their peripheries for determining which of said groups will engage, a plurality of multi-finger feelers mounted on floating pivots adjacent said plates, and means for normally urging said pivotal points toward said plates.

10. In a machine of the class described, the combination of a plurality of groups of totalizers, supporting means for each group, means for actuating any totalizer in any group, the totalizers being normally disengaged from the actuating means, means for engaging any desired totalizer in one or more of said groups with and disengaging it or them from said actuating means, a plurality of rotatable plates having notches cut in their peripheries for determining which of said groups will engage one of its totalizers with the actuating means, a plurality of multi-finger feelers, pivoted arms on which the feelers are mounted, and means adapted normally to shift said feelers toward said plates, the unnotched sections of the peripheries of said plates adapted to prevent said shifting upon certain adjustments of said plates and automatically change the fulcrum or pivot points of said arms.

11. In a machine of the class described, the combination of a plurality of groups of totalizers, supporting means for each group, means for actuating any totalizer in any group, the totalizer being normally disengaged from the actuating means, means for engaging any desired totalizer in one or more of said groups with and disengaging it or them from said actuating means, a plurality of rotatable plates having notches cut in their peripheries for determining which of said groups will engage, a plurality of multi-finger feelers mounted on pivoted arms, and means including pivoted members adapted normally to shift said feelers towards said plates, the unnotched sections of the peripheries adapted to prevent said shifting upon certain adjustments of said plates to change the pivot points of said members, and the notches adapted to permit said shifting movement to maintain the normal pivot points of said members.

12. In a machine of the class described, the combination of a plurality of totalizers, supporting means for each group, means for actuating any desired totalizer, the totalizers being normally disengaged from the actuating means, means for engaging any desired totalizer in one or more of said groups with and disengaging it or them from said actuating means, and means for selectively controlling the engaging means for said groups, comprising a plurality of rotatable plates, each provided with a plurality of high and low portions, and a plurality of multi-finger feelers carried on pivoted arms adjacent the centers thereof, said arms being normally swung on pivots adjacent one end thereof, the feelers adapted to cooperate with high portions on said plates that are out of alinement with each other to cause the fulcrums of said arms to shift from their normal pivot points to the points at which the feelers are attached.

13. In a machine of the class described, the combination of a plurality of groups of totalizers, supporting means for each group, means for actuating any totalizer in any group, the totalizers being normally disengaged from the actuating means, means for engaging any desired totalizer in one or more of said groups with and disengaging it or them from said actuating means, a plurality of rotatable plates having high and low portions in their peripheries for determining which of said groups will engage their totalizers with the actuators, and a plurality of multi-finger feelers carried by their respective pivoted coupling arms and cooperating simultaneously with a plurality of said high portions out of alinement with each other, to change the fulcrums of the respective coupling arms to render the corresponding totalizer engaging means effective.

14. In a machine of the class described capable of performing adding and total taking operations, totalizer actuating means, totalizer engaging means, said totalizers being normally disengaged from the totalizer actuating means, and means, including a shiftable multi-fingered feeler for controlling the effectivity of said engaging means during adding operations, said feeler controlled as to its shifting by members having high and low portions, a plurality of the high portions cooperating with the feeler to prevent the shifting thereof to render the engaging means effective, and a single low portion cooperating with the feeler to permit the shifting thereof to render said engaging means ineffective.

15. In a machine of the class described, the combination of totalizer engaging means, adjustable controlling plates therefor arranged side by side, and means cooperating with non-adjacent plates to prevent an operation of said engaging means regardless of the position of an intermediate plate.

16. In a machine of the class described, the combination of a plurality of totalizers, actuators therefor, said totalizers being normally disengaged from the actuators, means for engaging any totalizer with and disengaging any totalizer from the actuators, a plurality of differentially adjustable control plates, feeling devices provided with a feeling finger for each of said control plates, and pivotally supported members carrying said devices and shiftable in one direction around one pivot point to move the fingers into contact with the control plates, said members being shiftable an invariable extent around another pivot point upon contact of the feelers with the plates, to control the effectivity of the totalizer engaging means.

17. In a machine of the class described, the combination of a plurality of totalizers, actuators therefor, said totalizers being normally disengaged from the actuators, means to engage the totalizers with and disengaging the totalizers from the actuators, a plurality of differentially adjustable control plates, feeling devices provided with a feeling finger for each of said control plates, means tending to normally hold the fingers in contact with the control plates, and means having a plurality of pivot points and movable about one of said points to remove said fingers from said plates to permit adjustment of the plates, and movable about the same one point to move the fingers into contact with the control plates, and movable about another pivot point to render the totalizer engaging means effective.

18. In a machine of the class described, the combination of a plurality of totalizers, actuators therefor, said totalizers being normally disengaged from the actuators, means for engaging the totalizers with and disengaging the totalizers from the actuators, a plurality of differentially adjustable control plates having peripheral notches, and feeling devices associated with their respective totalizers, and having oppositely projecting feeling fingers, each of said fingers adapted to co-operate with one of said control plates whereby the entry of any finger into a notch in the periphery of its associated plate renders the engaging means ineffective, whereas the contact of any two oppositely extending fingers with the unbroken peripheries of their associated plates renders the engaging means effective.

19. In a machine of the class described, the combination of a plurality of groups of totalizers, supporting means for each group, means for actuating any totalizer in any group, said totalizers being normally disengaged from the actuators, means for engaging any desired totalizer in one or more of said groups with and disengaging the totalizers from said actuating means, a plurality of rotatable plates having notches cut in their peripheries for determining which of said groups will engage, a plurality of multi-fingered feelers; floating supporting means on which the feelers are pivotally mounted and shiftable about a plurality of pivot points thereof; and means to shift the feelers towards and from the control plates.

20. In a machine of the class described, the combination of a plurality of groups of totalizers, supporting means for each group, means for actuating any totalizer in any group, said totalizers being normally disengaged from the actuating means, means for engaging any desired totalizer in one or more of said groups with and disengaging it or them from said actuating means, a plurality of rotatable plates having notches cut in their peripheries for determining which of said groups will engage, a plurality of multi-fingered feelers; floating supports to which the feelers are pivoted intermediate their ends, said supports being shiftable about a plurality of pivot points thereof; and means to shift the supports about one of the pivots to move the feelers towards the control plates to change the pivot points or fulcrums of the floating supports when the control plates are set in certain positions.

21. In a machine of the class described, the combination with a plurality of groups of totalizers; independently operable supporting means for each group of totalizers; totalizer actuating means, said totalizers being normally disengaged from the actuators; and means to engage and disengage any desired totalizer in one or more of said groups relatively to the actuating means; of a plurality of plates having notches formed in their peripheries to selectively control the effective operation of the engaging and disengaging means; and a plurality of multi-fingered feelers; pivoted devices carrying the feelers, said devices adapted to receive different types of adjustment; the fingers of the feelers cooperating with the notched peripheries of all the control plates to give the devices one type of adjustment to select a totalizer or totalizers for operation, and another type of adjustment to prevent the selection of a totalizer.

22. In a machine of the class described, the combination with a plurality of groups of totalizers; independently operable supporting means for each group of totalizers; totalizer actuating means, said totalizers being normally disengaged from the actuating means; and means to engage and disengage any desired totalizer in one or more of said groups, relatively to the actuating means; of a plurality of adjustable members to selectively control the effective operation of the engaging and disengaging means; and a plurality of multi-fingered feelers to coact with the adjustable control members, there being relative movement between the adjustable members and the feelers, as the latter co-act with the control members.

23. In a machine of the class described, the combination with a plurality of groups of totalizers; independently operable supporting means for each group of totalizers; totalizer actuating means, said totalizers being normally disengaged from the actuating means; and means to engage and disengage any desired totalizer in one or more of said groups, relatively to the actuating means; of a plurality of adjustable members to selectively control the effective operation of the engaging and disengaging means; and a plurality of multi-fingered feelers to coact with the adjustable control members; and shiftable supports on which the feelers are pivoted, the feelers adapted for pivotal movement at points adjacent their centers while the feelers are in contact with the control plates, and for pivotal movement about another point to move the feelers into and out of contact with the control plates.

24. In a machine of the class described, the combination with a plurality of groups of totalizers; independently operable supporting means for said group of totalizers; totalizer actuating means, said totalizers being normally disengaged from the actuating means; and means to engage and disengage any desired totalizer in one or more of said groups relatively to the actuating means; of means to select which of the totalizers shall be engaged with the actuating means, such selecting means including a plurality of control members; and a plurality of multi-fingered feelers to co-act with the control members; and means to relatively adjust the control members and feelers.

25. In a machine of the class described, the combination with a plurality of groups of totalizers; independently operable supporting means for said group of totalizers; totalizer actuating means, said totalizers being normally disengaged from the actuating means; and means to engage and disengage any desired totalizer in one or more of said groups relatively to the actuating means; of means to select which of the totalizers shall be engaged with the actuating means, such selecting means including a plurality of control members; and a plurality of multi-fingered feelers to co-act with the control members; movable supports on which the feelers are pivotally mounted; and means to effect a plurality of different types of relative adjustments of the supports under the control of the feelers and control members.

26. In a machine of the class described, the combination with a plurality of groups of totalizers; independently operable supporting means for said group of totalizers; totalizer actuating means, said totalizers being normally disengaged from the actuating means; and means to engage and disengage any desired totalizer in one or more of said groups relatively to the actuating means; of means to select which of the totalizers shall be engaged with the actuating means, such selecting means including a plurality of rotatably supported control members, and a plurality of pivotally mounted multi-fingered feelers to co-act with the control members; devices carrying the feelers and adapted to receive different types of adjustments; and means to relatively adjust the control members to cause different types of movements of the devices and feelers.

27. In a machine of the class described, the combination with a plurality of totalizers; actuators therefor, said totalizer being normally disengaged from the actuators; and means to engage and disengage the totalizers and actuators; of a plurality of adjustable control plates having peripheral notches; and flexibly mounted feelers related to their respective totalizers, and having oppositely extending fingers adapted to enter the notches in the peripheries of the control plates under certain adjustments of the latter, to prevent effective operation of the totalizer-engaging means on their corresponding totalizers.

28. In a machine of the class described, the combination of a plurality of groups of totalizers; supporting means for each group; means to actuate any totalizer in any group, the totalizers being normally disengaged from the actuating means; means to engage and disengage any totalizer in one or more groups relatively to the actuating means; and means to determine the engagement and disengagement of the totalizers relatively to their actuating means, including a plurality of rotatable notched control plates, adjustment of which determines which of the groups of totalizers shall engage the actuating means; setting means, including toggle members; links having loose connections with one element of the respective toggle members; and multi-fingered feelers pivoted to the same toggle elements, respectively, and adapted to contact the notched control plates to determine whether the links shall fulcrum on their loose connections with the toggle members, or at the pivot points of the feelers with their toggle members.

29. In a machine of the class described, the combination of a plurality of totalizers; actuators therefor; the totalizers being normally disengaged from the actuators; means to engage and disengage any totalizer relatively to the actuators; and means to determine which of the totalizers shall be engaged with or remain disengaged from the actuators, such means including a plurality of differentially adjustable notched control plates; toggle members, one element of each of which toggles is pivotally supported at one end, the remaining element of each of which toggles is loosely connected with the engaging and disengaging means of its respective totalizer at the end farthest from the toggle joint; and multi-fingered feelers pivoted to the last-named toggle members, to cooperate with the control plates to control the effectiveness of the means which determines the engagement of the totalizers, the relative positions of the control plates and feelers determining whether the last-named toggle element of each toggle shall turn about the pivot point of the feeler with such toggle element, or the connection of the toggle element with its totalier engaging and disengaging means.

In testimony whereof I affix my signature.

BERNIS M. SHIPLEY.

CERTIFICATE OF CORRECTION.

Patent No. 1,749,960.　　　　　　　　　　　Granted March 11, 1930, to

BERNIS M. SHIPLEY.

It is hereby certified that error appears in the printed specification of the above numbered patent requiring correction as follows: Page 4, lines 101 and 102, for the word "movement" read "movements", and line 109, after the word "plates" and before the period insert "1150, 1151 and 1152 appropriate to the front, back and upper lines, respectively"; page 5, line 112, for the word "Opposite" read "The opposite", and line 113, for "shaft" read "shafts"; page 6, line 127, for the word "plates" read "plate"; page 9, line 31, claim 2, after the word "cooperate" and before the period insert the words "with said plates"; page 12, line 118, claim 29, for the misspelled word "totalier" read "totalizer"; and that the said Letters Patent should be read with these corrections therein that the same may conform to the record of the case in the Patent Office.

Signed and sealed this 8th day of April, A. D. 1930.

(Seal)

M. J. Moore,
Acting Commissioner of Patents.